US012603206B2

(12) United States Patent
Abe et al.

(10) Patent No.: US 12,603,206 B2
(45) Date of Patent: Apr. 14, 2026

(54) COMPOSITE COMPONENT AND METHOD FOR PRODUCING SAME

(71) Applicant: NICHIA CORPORATION, Anan (JP)

(72) Inventors: Masahiro Abe, Tokushima (JP); Rie Yoshida, Anan (JP); Shuichi Tada, Komatsushima (JP); Michiya Kume, Anan (JP); Kohei Ihara, Tokushima (JP); Naotake Fujita, Hiroshima (JP)

(73) Assignee: NICHIA CORPORATION, Anan-shi (JP)

( * ) Notice: Subject to any disclaimer, the term of this patent is extended or adjusted under 35 U.S.C. 154(b) by 274 days.

(21) Appl. No.: 18/247,391

(22) PCT Filed: Sep. 28, 2021

(86) PCT No.: PCT/JP2021/035621
§ 371 (c)(1),
(2) Date: Mar. 30, 2023

(87) PCT Pub. No.: WO2022/071310
PCT Pub. Date: Apr. 7, 2022

(65) Prior Publication Data
US 2024/0013961 A1 Jan. 11, 2024

(30) Foreign Application Priority Data
Sep. 30, 2020 (JP) ................................. 2020-165418

(51) Int. Cl.
*B29C 45/14* (2006.01)
*H01F 1/053* (2006.01)
(Continued)

(52) U.S. Cl.
CPC ....... *H01F 7/021* (2013.01); *B29C 45/14008* (2013.01); *B29C 45/14639* (2013.01);
(Continued)

(58) Field of Classification Search
CPC ........ B29C 45/14008; B29C 45/14639; B29C 2045/14893; H01F 41/0253; H01F 41/0266
(Continued)

(56) References Cited

U.S. PATENT DOCUMENTS 6,007,312 A * 12/1999 Pieters .................. F04D 29/026
29/607 X
6,033,610 A * 3/2000 Swanson ................. B29C 45/16
264/250
2009/0079527 A1 3/2009 Noda et al.

FOREIGN PATENT DOCUMENTS

JP S57177263 A 10/1982
JP H06193583 A 7/1994
(Continued)

*Primary Examiner* — Leo B Tentoni
(74) *Attorney, Agent, or Firm* — Hunton Andrews Kurth LLP

(57) ABSTRACT

The present invention relates to a method of producing a composite component, the method including: preparing a second composite by fitting a first molded body onto a first composite including a rare earth magnet and a component contacting the rare earth magnet, such that the first molded body covers at least the entire surface of the first composite corresponding to the rare earth magnet; and forming a second molded body by inserting the second composite into a mold and injection-molding a thermoplastic resin such that the thermoplastic resin covers at least the entire surface of the first composite not covered by the first molded body and also contacts the first molded body.

14 Claims, 5 Drawing Sheets

(51) Int. Cl.
    *H01F 7/02*          (2006.01)
    *H01F 41/02*       (2006.01)

(52) U.S. Cl.
    CPC ....... *H01F 1/0536* (2013.01); *H01F 41/0253*
              (2013.01); *B29C 2045/14893* (2013.01)

(58) Field of Classification Search
    USPC ........ 264/250, 255, 265, 279, 328.1; 29/607
    See application file for complete search history.

(56)                   References Cited

FOREIGN PATENT DOCUMENTS

| JP | 2003259578 A | 9/2003 |
|----|--------------|--------|
| JP | 2006043400 A | 2/2006 |
| JP | 2006-114118 A | 4/2006 |
| JP | 2006115595 A | 4/2006 |
| JP | 2009065027 A | 3/2009 |
| JP | 2020054089 A | 4/2020 |

* cited by examiner

COMPOSITE COMPONENT AND METHOD FOR PRODUCING SAME

CROSS-REFERENCE TO RELATED APPLICATIONS

This application is a national phase of International Application No. PCT/JP2021/035621, filed on Sep. 28, 2021, which claims priority to Japanese Patent Application No. 2020-165418, filed on Sep. 30, 2020, the disclosures of which are hereby incorporated by reference in their entireties.

TECHNICAL FIELD

The present invention relates to a composite component including a rare earth magnet and a method of producing the composite component.

BACKGROUND ART

In order to prevent corrosion of a permanent magnet at low cost, it has been known to cover the entire permanent magnet with a resin. For example, Patent Literature 1 discloses a rotor magnet body and a method which includes placing a permanent magnet and a ring-shaped yoke component in a mold together with a polyphenylene sulfide (PPS) resin spacer and injection-molding the PPS resin to cover the entire permanent magnet.

CITATION LIST

Patent Literature

Patent Literature 1: JP 2006-115595 A

SUMMARY OF INVENTION

Technical Problem

However, a problem exists in that when injection molding is performed on a rare earth magnet, the rare earth magnet directly contacts the resin, so that the magnetic properties of the permanent magnet can be deteriorated due to heat. Another problem is that as the injection-molded resin shrinks after molding, a gap is created between the spacer and the magnet, making it impossible to completely cover the entire permanent magnet.

The present invention aims to provide a composite component in which a rare earth magnet is sealed and a method of producing a composite component which reduces deterioration in magnetic properties during the production.

Solution to Problem

Embodiments of the present invention relate to a method of producing a composite component, the method including:

preparing a second composite by fitting a first molded body onto a first composite including a rare earth magnet and a component contacting the rare earth magnet, such that the first molded body covers at least an entire surface of the first composite corresponding to the rare earth magnet; and forming a second molded body by inserting the second composite into a mold and injection-molding a thermoplastic resin such that the thermoplastic resin covers at least an entire surface of the first composite not covered by the first molded body and also contacts the first molded body.

Embodiments of the present invention relate to a composite component, including:

a first composite including a rare earth magnet and a component contacting the rare earth magnet;

a first molded body covering at least an entire surface of the first composite corresponding to the rare earth magnet, and a second molded body covering at least an entire surface of the first composite not covered by the first molded body and also contacting the first molded body.

Advantageous Effects of Invention

According to the above embodiments, it is possible to provide a composite component in which a rare earth magnet is sealed and a method of producing a composite component which reduces deterioration in magnetic properties during the production.

DESCRIPTION OF EMBODIMENTS

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved. Moreover, the expressions such as "up", "down", "vertical", "left", "right", "horizontal", etc. in the embodiments only indicate the relative positional relationships and do not have to correspond to the relationships during use.

Figure 2A:
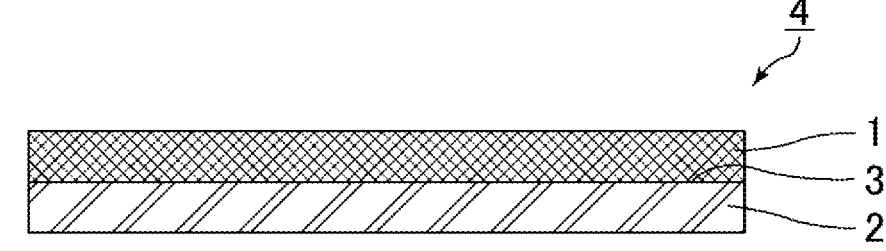
FIG. 2A shows a cross-sectional view of a first composite obtained in the step of preparing a first composite.
Figure 2B:
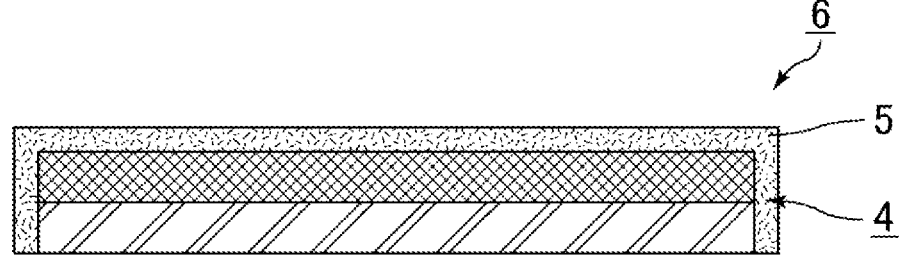
FIG. 2B shows a cross-sectional view of a second composite obtained in the step of preparing a second composite.
Figure 2C:
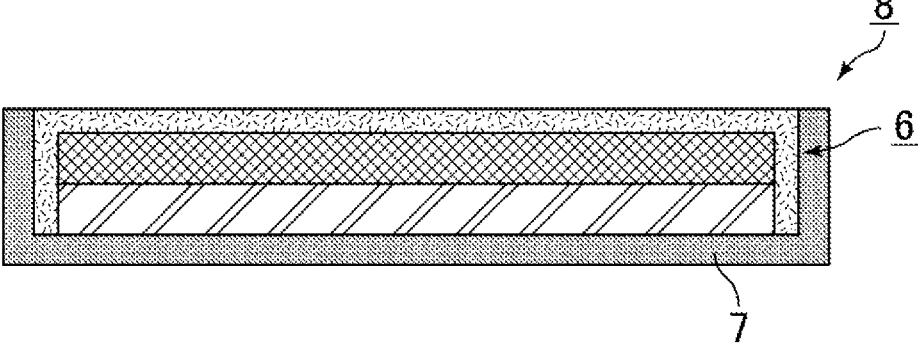
FIG. 2C shows a cross-sectional view of a composite component according to embodiments of the present invention obtained in the step of forming a second molded body.

A method of producing a composite component according to embodiments of the present invention includes: preparing a second composite by fitting a first molded body onto a first composite including a rare earth magnet and a component contacting the rare earth magnet, such that the first molded body covers at least the entire surface of the first composite corresponding to the rare earth magnet; and forming a second molded body by inserting the second composite into a mold and injection-molding a thermoplastic resin such that the thermoplastic resin covers at least the entire surface of the first composite not covered by the first molded body and also contacts the first molded body. FIG. 2A, FIG. 2B, and FIG. 2C each show a cross-sectional view of the composites and composite component prepared by the steps in the method of producing a composite component according to embodiments of the present invention when the composite component is a disc-shaped composite component. FIG. 2A shows a cross-sectional view of a first composite obtained in the step pf preparing a first composite, FIG. 2B shows a cross-sectional view of a second composite obtained in the step of preparing a second composite, and FIG. 2C shows a cross-sectional view of a composite component according to embodiments of the present invention obtained in the step of forming a second molded body. According to the production method of embodiments of the present invention, the entire rare earth magnet surface of the first composite is covered with the first molded body, and then the entire remaining surface of the first composite is covered with the thermoplastic resin by injection molding. Thus, the rare earth magnet does not directly contact the thermoplastic resin during the injection molding, which makes it possible to reduce deterioration of the magnetic properties of the rare earth magnet due to heat, and deformation of the bonded magnet due to heat, and also to provide a composite component in which a rare earth magnet is sealed.

Step of Preparing First Composite

The method may include preparing a first composite before the step of preparing a second composite. In the step of preparing a first composite, a rare earth magnet (first component) may be combined with a component (second component) such that they contact each other to prepare a first composite having a joint surface. The term "joint surface" means a surface where both components contact each other. Since the rare earth magnet and the component are held by a first molded body and a second molded body in the subsequent steps, the joint surface does not need to be fixed, magnetically adsorbed, or bonded with an adhesive. However, in view of handleability during fitting the first molded body onto the first composite and during inserting into a mold a second composite prepared by fitting the first molded body onto the first composite, the joint surface is preferably magnetically adsorbed, fixed, or bonded with an adhesive. Further, other than adsorption, fixing, or bonding, a first composite may be prepared by injection-molding a bonded magnet directly onto a component provided with a plurality of grooves. The direction of the magnetic field of the rare earth magnet in the first composite is not limited. For example, for use in axial gap rotors, a rare earth magnet magnetized parallel to the height direction of a first composite may be used, whereas for use in radial gap rotors, a rare earth magnet magnetized perpendicular to the height direction may be used.

Non-limiting examples of the rare earth magnet used to form a first composite include bonded magnets and sintered magnets. When the rare earth magnet used to form a first composite is a bonded magnet, a first molded body is fitted such that it covers the entire surface of the bonded magnet, and then a thermoplastic resin is injection-molded in the step of forming a second molded body. Thus, the bonded magnet does not directly contact the hot resin, which makes it possible to reduce deterioration of the magnetic properties due to heat, as well as deformation of the bonded magnet.

Non-limiting examples of rare earth magnetic powder used in bonded magnets or sintered magnets include rare earth magnetic powder such as SmFeN-based magnetic powder, NdFeB-based magnetic powder, and SmCo-based magnetic powder. Among the rare earth magnetic powder, SmFeN-based magnetic powder is more preferred because they are superior to NdFeB-based magnetic powder in terms of heat resistance and because they use no rare metal unlike SmCo-based magnetic powder. SmFeN-based magnetic powder may be nitrides having a $Th_2Zn_{17}$-type crystal structure and containing the rare earth metal samarium (Sm), iron (Fe), and nitrogen (N) as represented by the general formula: $Sm_xFe_{100-x-y}N_y$, wherein the value "x" representing the atomic percentage of the rare earth metal Sm is in the range of at least 8.1% but not more than 10%; the value "y" representing the atomic percentage of N is in the range of at least 13.5% but not more than 13.9%; and the balance is mainly Fe. NdFeB-based or SmCo-based rare earth magnetic powder or ferrite-based magnetic powder may also be used together with SmFeN-based magnetic powder.

For example, SmFeN-based magnetic powder may be produced by the method disclosed in JP 3698538 B. Thus, SmFeN-based magnetic powder having an average particle size of at least 2 μm but not more than 5 μm and a standard deviation within 1.5 may be suitably used.

Moreover, for example, NdFeB-based magnetic powder may be produced by the HDDR method described in JP 3565513 B. The NdFeB-based magnetic powder may suitably have an average particle size of at least 40 μm but not more than 200 μm and a maximum energy product of at least 34 MGOe but not higher than 42 MGOe (at least 270 kJ/m³ but not higher than 335 kJ/m³). Furthermore, for example, SmCo-based magnetic powder may be produced by the method disclosed in JP 3505261 B, and may have an average particle size of at least 10 μm but not higher than 30 μm.

The average particle size of the magnetic powder used is preferably not more than 10 μm, more preferably at least 1 μm but not more than 5 μm. When the average particle size is more than 10 μm, irregularities, cracks, or other defects may occur on the surface of the bonded magnet, thereby impairing the appearance. Moreover, when the average particle size is less than 1 μm, the cost of the magnetic powder may be increased. Here, the average particle size is defined as the particle size corresponding to the 50th percentile of the cumulative undersize particle size distribution by volume.

The magnetic material may be surface-treated with a silane coupling agent. The surface treatment with a silane coupling agent or the like can reduce a viscosity increase during injection molding.

The silane coupling agent may be a silane coupling agent represented by the formula: X—Si—(OR)$_n$ wherein X represents an alkyl group having a polar group at the end; R represents an alkyl group having at least 1 but not more than 3 carbon atoms; and n represents an integer of at least 1 but not more than 3, and the polar group in X preferably has an amino group, a ureido group, an epoxy group, a thiol group, or a methacryloxy group. When the thermoplastic resin used is a nylon resin, it is preferred to use a silane coupling agent having an amino group with high affinity for the nylon resin, particularly preferably 3-aminopropyltrimethoxysilane, 3-aminopropyltriethoxysilane, 3-(2-aminoethyl)aminopropyltrimethoxysilane, or 3-(2-aminoethyl)aminopropylmethyltriethoxysilane.

Non-limiting examples of resins used in bonded magnets include thermosetting resins and thermoplastic resins. Examples of the thermosetting resins include epoxy resins. Moreover, the thermoplastic resins may include resins having a low melting point because as the entire surface of the bonded magnet of the first composite is covered by the first molded body, the bonded magnet does not directly contact the hot resin during injection molding. For example, the thermoplastic resins used in bonded magnets may include resins having a melting point of 240° C. or lower, particularly of at least 120° C. but not higher than 200° C. Examples of the thermoplastic resins include polypropylene, polyethylene, poly(vinyl chloride), polyester, polyamide, polycarbonate, polyphenylene sulfide, and acrylic resins. Moreover, preferred among the thermoplastic resins are crystalline polypropylene and crystalline polyamide which have a relatively low melting point, low water absorption, and good moldability, with crystalline polypropylene being particularly preferred. These may also be appropriately mixed before use. Moreover, the amount of the resin(s) used in the bonded magnet is not limited, but it is preferably at least 3% by mass but not more than 20% by mass, more preferably at least 5% by mass but not more than 15% by mass, based on the total magnet. When the amount is less than 3% by mass, the amount of the resin relative to the rare earth magnetic powder may be small, making it difficult to produce a bonded magnet. When the amount is more than 20% by mass, a sufficient magnetic flux density as a magnet may not be provided.

The bonded magnet used may contain components generally compounded in bonded magnets, such as antioxidants, lubricants, and heavy metal deactivators. Moreover, the magnetic powder used in the embodiments is preferably surface-treated to improve oxidation resistance, water resistance, wettability with the resin, and chemical resistance. Here, these treatments may be used in combination as needed. The surface treatment may be carried out by a wet process, a dry process using a mixer or the like, plating, or vapor deposition, as needed. Other components such as weathering agents, plasticizers, flame retardants, and antistatic agents may also be added as needed.

The sintered magnet used may contain components generally compounded in sintered magnets, such as metal binders.

The component (second component) forming the first composite may be any material that is durable to the temperature during the injection molding in the step of forming a second molded body. Examples include magnetic steel (magnetic material), non-magnetic steel (non-magnetic material), a resin, and ceramic. To ensure a higher magnetic flux density, magnetic steel (yoke) is preferred among these. For example, magnetic steel may be used when the rare earth magnet is magnetized parallel to the height direction of the first composite, and the use of magnetic steel can increase the magnetic flux density. Moreover, for example, a non-magnetic material may be used when the rare earth magnet is magnetized perpendicular to the height direction of the first composite, and the use of a non-magnetic material can increase the leakage flux around the working surface. The raw materials forming the component (second component) are not the same as the raw materials forming the rare earth magnet (first component). For example, the component may contain no magnetic powder. Alternatively, when the component and the rare earth magnet are formed only from the same raw materials, the ratio of the raw materials of the component is different from the ratio of the raw materials of the rare earth magnet. When the component contains magnetic powder, the mass percentage of magnetic powder based on the total component may be lower than the mass percentage of magnetic powder based on the total rare earth magnet. When the component contains magnetic powder, the component may contain magnetic powder (e.g., ferrite-based magnetic powder) that is different from the type of the magnetic powder (e.g., SmFeN-based magnetic powder) contained in the rare earth magnet. The component may consist of a plurality of parts. The component may constitute all portions of the first composite other than the rare earth magnet.

Step of Preparing Second Composite

A second composite may be prepared by fitting a first molded body onto the first composite such that the first molded body covers at least the entire surface of the first composite corresponding to the rare earth magnet. Specifically, the first molded body may cover all of the surface of the rare earth magnet corresponding to the surface of the first composite. The first molded body may cover all of the surface of the rare earth magnet exposed on the component (second component). The material of the first molded body may be any material that can cover the entire rare earth magnet surface. Examples include non-magnetic steel, magnetic steel, a resin, and ceramic. The raw materials forming the first molded body may not be the same as the raw materials forming the rare earth magnet. For example, the first molded body may contain no magnetic powder. The first molded body may be a solid component that can be fitted onto the first composite. The first molded body is, for example, a resin molded body.

The first molded body has a higher resistance to the environment than the rare earth magnet. When the first molded body and the rare earth magnet are formed only from the same raw materials, the ratio of the raw materials in the first molded body may be different from the ratio of the raw materials in the rare earth magnet. When the first molded body contains magnetic powder, the mass percentage of the magnetic powder relative to the total mass of the first molded body may be lower than the mass percentage of the magnetic powder relative to the total mass of the rare earth magnet. When the first molded body contains magnetic powder, the first molded body may contain magnetic powder that is different from the type of the magnetic powder contained in the rare earth magnet. The rare earth magnet may contain first magnetic powder that is rare earth magnetic powder and a first resin, and the first molded body may contain second magnetic powder and a second resin. The inclusion of magnetic powder in the first molded body can enhance the magnetic force of the composite component. In this case, at least one selected from the following conditions (1) to (3) is preferably satisfied:

(1) the mass ratio of the second magnetic powder to the second resin is smaller than the mass ratio of the first magnetic powder to the first resin;

(2) the second resin has a higher resistance to the environment than the first resin; and (3) the second magnetic powder has a higher resistance to the environment than the first magnetic powder. This can enhance the magnetic force of the composite component and the resistance to the environment of the composite component. For example, the condition (2) may include using a nylon 12 resin as the first resin and polyphenylene sulfide as the second resin. For example, the condition (3) may include using rare earth magnetic powder as the first magnetic powder and ferrite-based magnetic powder as the second magnetic powder. When the first molded body contains magnetic powder and a resin, the amount of the resin based on the total first molded body may be 20% by mass or higher and may be 50% by mass or higher.

The rare earth magnet has a first main surface, a second main surface which opposes the first main surface and which is joined to the component (second component), and a side surface that connects the first main surface and the second main surface. Although the first molded body needs to entirely cover the opposite surface (first main surface) not in contact with the component and the side surface of the rare earth magnet, the first molded body preferably covers the entire side surface of the first composite, as the contact area with the second molded body may be increased to enhance the adhesion. The component (second component) of the first composite has a third main surface that is joined to the rare earth magnet, a fourth main surface that opposes the third main surface, and a side surface that connects the third main surface and the fourth main surface. The fourth main surface of the component is exposed on the first molded body.

Figure 1A:
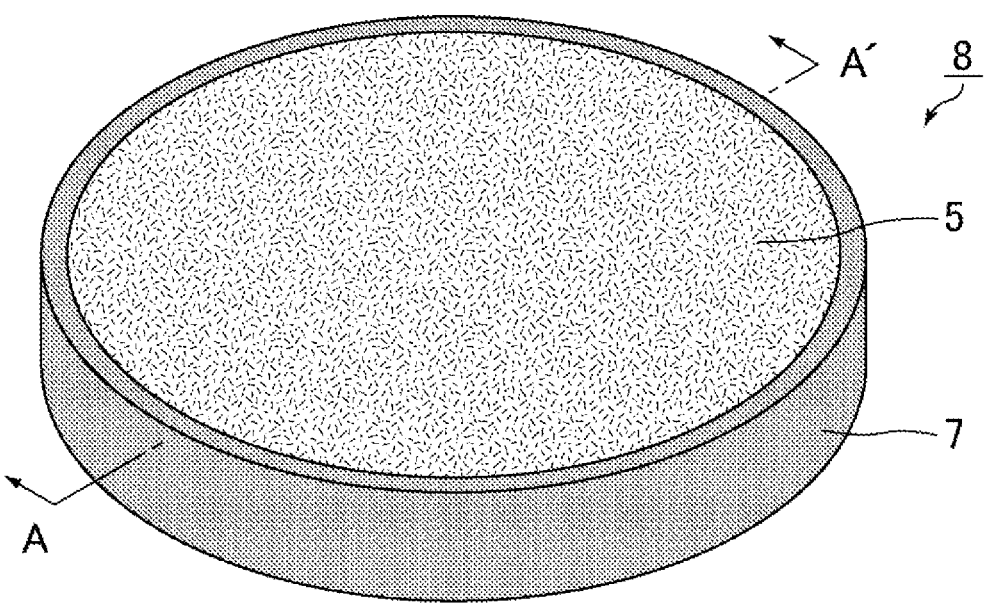
FIG. 1A shows a perspective view of a disc-shaped composite component according to embodiments of the present invention.
Figure 1B:
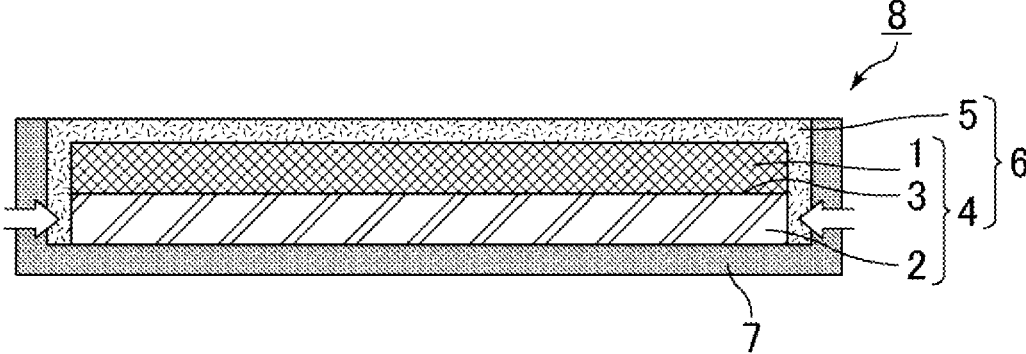
FIG. 1B shows an A-A' cross-sectional view of the composite component according to embodiments of the present invention.
Figure 1C:
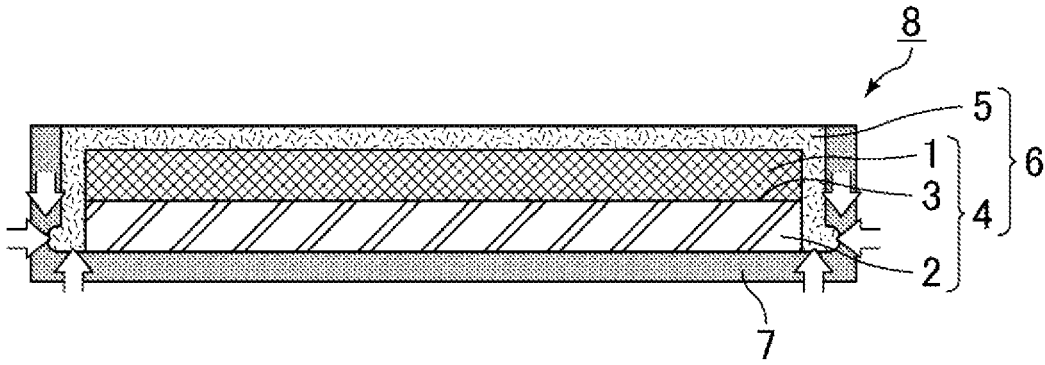
FIG. 1C shows an A-A' cross-sectional view of another composite component according to embodiments of the present invention.

FIG. 1A shows a perspective view of a disc-shaped composite component 8 according to embodiments of the present invention in which a first molded body covers the entire side surface of a first composite. FIG. 1B and FIG. 1C each show an A-A' cross-sectional view of FIG. 1A where the left side corresponds to the A side. The arrows shown in FIG. 1B and FIG. 1C indicate the post-molding shrinkage direction of an injection-molded thermoplastic resin. Although the shape of the side surface of the first molded body 5 is not limited, the thickness of the side surface is preferably uneven, as this may inhibit a second molded body 7 from coming off. Examples of such embodiments include those in which the side surface has a turnup or a protrusion as shown in FIG. 1C, those in which the side surface has a depression, and those in which the thickness of the side surface gradually decreases in either the up or down direction. The first molded body 5 particularly preferably has at least one selected from a turnup, a protrusion, and a depression, as the contact area with the second molded body 7 may be increased to enhance the adhesion. The turnup, protrusion, or depression of the first molded body 5 contacts the second molded body 7.

Figure 3A:
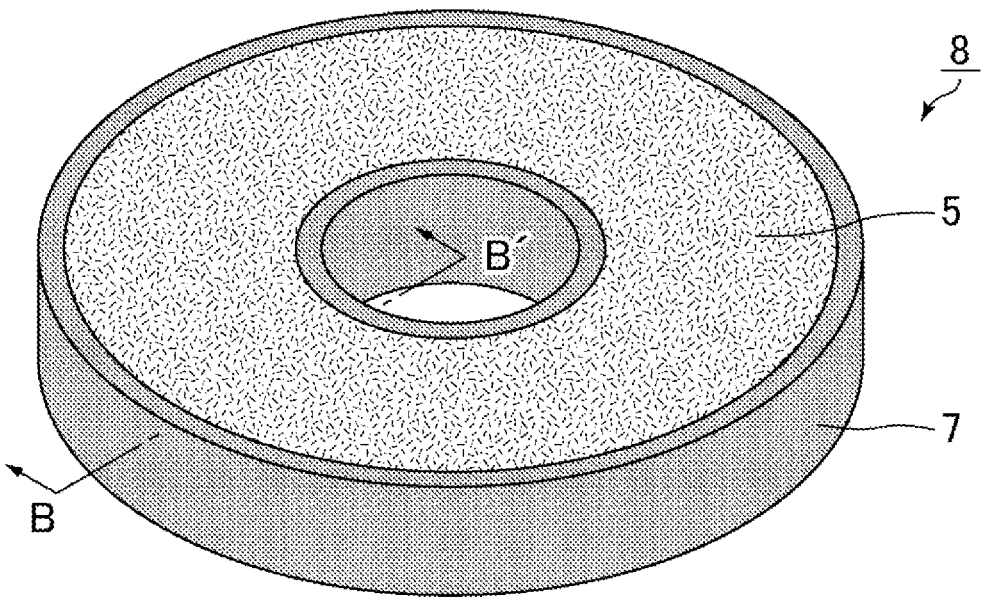
FIG. 3A shows a perspective view of a ring-shaped composite component according to embodiments of the present invention.
Figure 3B:
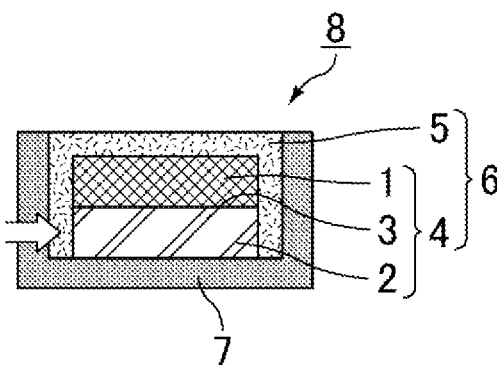
FIG. 3B shows a B-B' cross-sectional view of the ring-shaped composite component according to embodiments of the present invention.
Figure 3C:
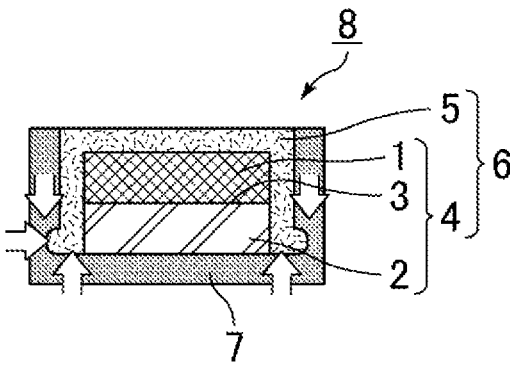
FIG. 3C shows a B-B' cross-sectional view of another ring-shaped composite component according to embodiments of the present invention.
Figure 3D:
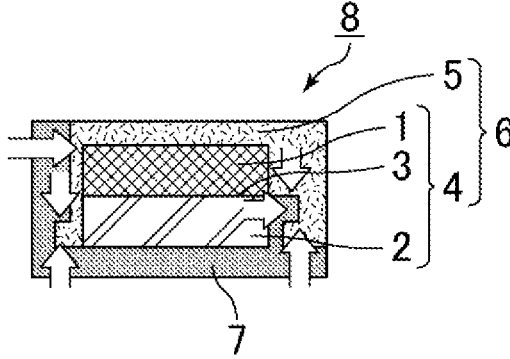
FIG. 3D shows a B-B' cross-sectional view of another ring-shaped composite component according to embodiments of the present invention.

FIG. 3A shows a perspective view of a ring-shaped composite component 8 according to embodiments of the present invention in which a first molded body covers the entire side surface of a first composite. FIG. 3B, FIG. 3C, and FIG. 3D each show a B-B' cross-sectional view of FIG. 3A where the left side corresponds to the B side. The arrows shown in FIG. 3B, FIG. 3C, and FIG. 3D indicate the post-molding shrinkage direction of an injection-molded thermoplastic resin. Although the shape of the side surface of the first molded body 5 is not limited, the thickness of the side surface is preferably uneven, as this may inhibit a second molded body 7 from coming off. Examples of such embodiments include those in which the side surface has a protrusion as in FIG. 3C, those in which the side surface has a turnup as in the side surface on the inner circumferential side of the ring in FIG. 3D, those in which the side surface has a depression, and those in which the thickness of the side surface gradually decreases in either the up or down direction. The first molded body 5 particularly preferably has at least one selected from a turnup, a protrusion, and a depression, as the contact area with the second molded body 7 may be increased to enhance the adhesion. The turnup, protrusion, or depression of the first molded body 5 contacts the second molded body 7. In FIG. 3D, a space to be filled with the injection-molded thermoplastic resin is present between the first molded body 5 and the first composite 4 on the inner circumferential side of the ring.

When the first molded body is a resin molded body, the raw materials forming the resin molded body are not limited as long as the raw materials allow the fitting on the first composite to be maintained at the temperature during the injection molding in the step of forming a second molded body. Examples of the resin forming the resin molded body include crystalline thermoplastic resins, amorphous thermoplastic resins, and thermosetting resins. Among these, the resin forming the resin molded body is preferably a crystalline thermoplastic resin. The crystalline thermoplastic resin preferably has a melting point of at least 120° C. but not higher than 340° C. and more preferably has a melting of at least 250° C. but not higher than 300° C. in view of the heat resistance of the resulting composite component. Examples of thermoplastic resins include polyphenylene sulfide and polyether ether ketone. Polyphenylene sulfide is preferred because it has low water absorption and excellent chemical resistance.

When the first molded body is a resin molded body, the resin molded body is preferably compatible with the thermoplastic resin used in the injection molding in the step of forming a second molded body. Specifically, the resin forming the first molded body is preferably compatible with the thermoplastic resin used in the injection molding in the step of forming a second molded body. Such two resins may be a combination of resins which are different in solubility parameter, SP value, by not more than 3, preferably by not more than 2. Preferably, the resins are the same. For example, the first molded body consists only of a resin. The method of producing a composite component may include forming a first molded body before the step of preparing a second composite. For example, a first molded body that has at least one selected from a protrusion, a turnup, and a depression, as well as a recess to be fitted to the first composite is formed in the step of forming a first molded body, and then the first composite is fitted into the recess of the first molded body in the step of preparing a second composite. In the step of forming a first molded body, a first molded body may be formed by injection-molding a thermoplastic resin. In this case, the first molded body is formed by injection molding using a mold, and the first molded body is taken out from the mold, followed by performing the step of preparing a second composite.

Step of Forming Second Molded Body

A second molded body may be formed by inserting the second composite into a mold and injection-molding a thermoplastic resin such that the thermoplastic resin covers at least the entire surface of the first composite not covered by the first molded body and also contacts the first molded body. Although the thermoplastic resin may be injection-molded to contact the first molded body, the thermoplastic resin is preferably injection-molded to overlap only a portion of the first molded body. For example, FIG. 2C shows an embodiment in which a thermoplastic resin overlaps the entire side surface of a first molded body. In FIG. 2C, a second molded body 7 covers the lower surface and side surface of a second composite 6 and does not cover the upper surface of the second composite 6. The resulting composite component may have any shape such as a disc shape or a ring shape.

For the disc-shaped composite component shown in FIG. 1A with the embodiment of the first molded body 5 shown in FIG. 1B, as the thermoplastic resin injection-molded to overlap the side surface of the first molded body 5 shrinks after molding, it may shrink from the left and right sides in the directions indicated by the arrows to clamp the first molded body 5, thereby sealing the first composite 4. When compared to the embodiment of the first molded body 5 shown in FIG. 1B, the embodiment of the first molded body 5 shown in FIG. 1C has a side surface with a protrusion. Thus, the thermoplastic resin may shrink after molding also in the up and down directions of the protrusion to clamp the first molded body 5, thereby firmly sealing the first composite 4.

For the ring-shaped composite component shown in FIG. 3A with the embodiment of the first molded body 5 shown in FIG. 3B, as the thermoplastic resin injection-molded to overlap the side surface on the outer circumferential side (B) of the ring shrinks after molding, it may shrink toward the center of the composite component 8, thereby sealing the first composite 4. When compared to the embodiment of the first molded body 5 shown in FIG. 3B, the embodiment of the first molded body 5 shown in FIG. 3C has a side surface with a protrusion. Thus, the thermoplastic resin may shrink also in the up and down directions of the protrusion to clamp the first molded body 5, thereby firmly sealing the first composite 4. Moreover, when compared to the embodiment of the first molded body 5 shown in FIG. 3B, the embodiment of the first molded body 5 shown in FIG. 3D has a side surface with a protrusion on the outer circumferential side (B) of the ring and has a side surface with a turnup on the inner circumferential side (B') of the ring. Moreover, in the embodiment shown in FIG. 3D, a space is present between the turnup of the first molded body 5 and the component 2 before the step of forming a second molded body 7. Then, a thermoplastic resin is injection-molded into the space between the component 2 and the turnup of the first molded body 5 on the inner circumferential side of the ring in the step of forming a second molded body 7. As the injection-molded thermoplastic resin shrinks after molding, it may shrink toward the center of the composite component 8 and also shrink in the up and down directions to sandwich the turnup. Also, at the protrusion of the side surface on the outer circumferential side of the ring, the thermoplastic resin may shrink also in the up and down directions of the protrusion to clamp the first molded body 5, thereby more firmly sealing the first composite 4.

Non-limiting examples of the resin used in the injection-molded body corresponding to the second molded body include crystalline thermoplastic resins and amorphous thermoplastic resins. Crystalline thermoplastic resins are preferred because of their high post-molding shrinkage rate. The thermoplastic resin used preferably has a melting point of at least 120° C. but not higher than 340° C. and more preferably has a melting of at least 250° C. but not higher than 300° C. in view of the heat resistance of the resulting composite component. Examples of thermoplastic resins include polyphenylene sulfide and polyether ether ketone. Polyphenylene sulfide is preferred because it has low water absorption and excellent chemical resistance. For example, the raw materials forming the second molded body are not the same as the raw materials forming the rare earth magnet. For example, the second molded body may contain no magnetic powder. Alternatively, when the second molded body and the rare earth magnet are formed only from the same raw materials, the ratio of the raw materials of the second molded body is different from the ratio of the raw materials of the rare earth magnet. When the second molded body contains magnetic powder, the mass percentage of magnetic powder based on the total second molded body may be lower than the mass percentage of magnetic powder based on the total rare earth magnet. When the second molded body contains magnetic powder, the second molded body may contain magnetic powder that is different from the type of the magnetic powder contained in the rare earth magnet. For example, the second molded body consists only of a thermoplastic resin. When the first molded body contains magnetic powder and the second molded body contains no magnetic powder, the magnetic force of the composite component can be further enhanced because the upper surface of the first molded body is exposed on the second molded body.

Composite Component

A composite component according to embodiments of the present invention includes: a first composite including a rare earth magnet (first component) and a component (second component) contacting the rare earth magnet; a first molded body covering at least the entire surface of the first composite corresponding to the rare earth magnet; and a second molded body covering at least the entire surface of the first composite not covered by the first molded body and also contacting the first molded body. The composite component according to embodiments of the present invention has excellent resistance to the environment (for example, heat resistance, water resistance, oil resistance, hot water resistance, chemical resistance, etc.) because the entire surface of the first composite including the rare earth magnet is sealed.

For example, the composite component may be prepared by the above-mentioned method of producing a composite component according to embodiments of the present invention. The structural elements are as described above. For example, the composite component according to embodiments of the present invention may employ the following structure. The rare earth magnet is a bonded magnet containing rare earth magnetic powder and a resin. The first molded body has at least one selected from a protrusion, a turnup, and a depression. The side surface of the component of the first composite is covered by the first molded body, and the side surface of the first molded body is covered by the second molded body. Alternatively, at least a portion of the side surface of the component of the first composite is exposed on the first molded body, and the portion of the side surface of the component exposed on the first molded body is covered by the second molded body.

Although examples of the composite component according to embodiments of the present invention are shown in FIG. 1B, FIG. 1C, FIG. 3B, FIG. 3C, and FIG. 3D as described above, other examples are shown in FIG. 4A, FIG. 4B, FIG. 4C, FIG. 5A, and FIG. 5B. FIG. 4A to FIG. 5B each show a cross-sectional view of a portion of a composite component, which may be used in a composite component having a disc shape, a ring shape, or other shape. Although FIG. 4A to FIG. 5B each show a left portion of a composite component, such a structure may be used only on the right side of a composite component or on both the left and right sides thereof. The composite components shown in FIG. 4A to FIG. 5B may be produced using a method as described for the above-mentioned method of producing a composite component.

Figure 4A:
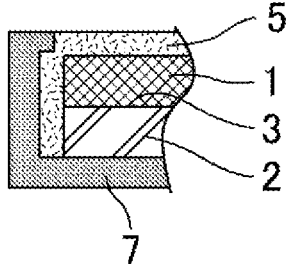
FIG. 4A shows a cross-sectional view of Variation 1 of the composite component according to embodiments of the present invention.

FIG. 4A shows a cross-sectional view of Variation 1 of the composite component according to embodiments of the present invention. A first molded body 5 shown in FIG. 4A has a corner connecting the upper surface and the side surface which forms a depression recessed toward the inside of a composite component. A portion of a second molded body 7 is provided at this depression portion. With regard to the thickness of a portion of the second molded body 7 covering the side surface of a second composite, the portion (upper end portion) of the second molded body 7 provided in the depression is thicker than the portion below the upper end portion. In other words, the second molded body 7 has at the upper end thereof a protrusion projecting toward the inside of the composite component. This allows the second molded body 7 to be more firmly fixed to the second composite. Moreover, increasing the thickness of the second molded body 7 may enhance the strength of the composite component, but if the horizontal thickness of the second molded body 7 is increased overall, either or both of an increase in the horizontal size of the composite component and a decrease in the horizontal size of the rare earth magnet may occur. When the thickness of the second molded body 7 is partially increased as shown in FIG. 4A, either or both of these may be reduced, and the strength of the composite component may be enhanced. By reducing the increase in the horizontal size of the composite component, it is possible to reduce an increase in stirring resistance when the composite component is used as a motor rotor. By reducing the decrease in the horizontal size of the rare earth magnet, it is possible to reduce a decrease in the function of the composite component as a magnet. In FIG. 4A, the lower end of the depression portion (corner) of the first molded body 5 is located above the upper surface of the first composite. In other words, the depression portion of the first molded body 5 is located at a portion which connects a portion of the first molded body 5 sandwiched between the side surface of the first composite and the second molded body 7 to a portion of the first molded body 5 contacting the upper surface of the first composite. With such a positional relationship, the protrusion of the second molded body 7 may be easily provided while avoiding direct contact between the second molded body 7 and the first composite.

Figure 4B:
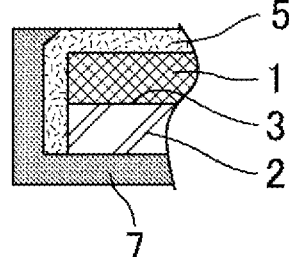
FIG. 4B shows a cross-sectional view of Variation 2 of the composite component according to embodiments of the present invention.

FIG. 4B shows a cross-sectional view of Variation 2 of the composite component according to embodiments of the present invention. Like Variation 1 shown in FIG. 4A, a first molded body 5 shown in FIG. 4B has a depression recessed toward the inside of a composite component. This allows Variation 2 shown in FIG. 4B to produce an effect as described for Variation 1 shown in FIG. 4A. The depression in FIG. 4A is quadrangular, whereas the depression in FIG. 4B is triangular.

Figure 4C:
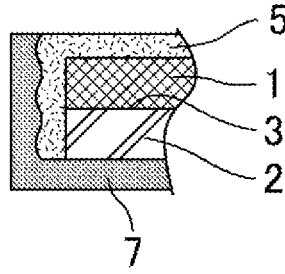
FIG. 4C shows a cross-sectional view of Variation 3 of the composite component according to embodiments of the present invention.

FIG. 4C shows a cross-sectional view of Variation 3 of the composite component according to embodiments of the present invention. A first molded body 5 shown in FIG. 4C has a plurality of depressions recessed toward the inside of a composite component. This makes it possible to enhance the strength of the composite component by increasing the horizontal thickness of a second molded body 7 without affecting the horizontal size of the composite component and/or rare earth magnet. Moreover, the plurality of depressions of the first molded body 5 allow the second molded body 7 to more firmly seal a first composite. In FIG. 4C, the contact interface between the side surface of the first molded body 5 and the second molded body 7 is wavy.

Figure 5A:
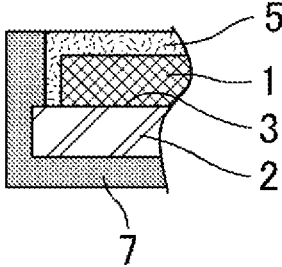
FIG. 5A shows a cross-sectional view of Variation 4 of the composite component according to embodiments of the present invention.

FIG. 5A shows a cross-sectional view of Variation 4 of the composite component according to embodiments of the present invention. The side surface of a component 2 shown in FIG. 5A is not covered by a first molded body 5. The side surface of the component 2 is in contact with a second molded body 7. The side surface of the component 2 is located outward from the side surface of the first molded body 5. A portion of the component 2 protruding outwardly from the side surface of the first molded body 5 is covered by the second molded body 7. Such a contact between the side surface of the component 2 and the second molded body 7 may be aimed at reducing the probability of separation of the first composite from the second molded body 7. For example, the structure of FIG. 5A may be formed by adjusting the horizontal size of the component 2 to be larger than the horizontal size of a rare earth magnet 1. When the side surface of the component 2 is not covered by the first molded body 5 as shown in FIG. 5A, the component 2 cannot be fixed by the first molded body 5. Hence, in this case, the component 2 and the rare earth magnet 1 may be joined by a method that can prevent the component 2 from coming off the rare earth magnet 1, such as bonding with an adhesive.

Figure 5B:
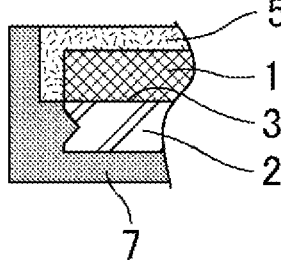
FIG. 5B shows a cross-sectional view of Variation 5 of the composite component according to embodiments of the present invention.

FIG. 5B shows a cross-sectional view of Variation 5 of the composite component according to embodiments of the present invention. Like Variation 4 shown in FIG. 5A, the side surface of a component 2 in FIG. 5B is in contact with a second molded body 7. This allows Variation 5 shown in FIG. 5B to produce an effect as described for Variation 4 shown in FIG. 5A. In FIG. 5B, the side surface of the component 2 has a depression, and a portion of the second molded body 7 is provided at this depression portion. As this allows the second molded body 7 to be partially thick, the second molded body 7 is expected to enhance the strength of the composite component. The side surface of the component 2 in FIG. 5B is located inward from the side surface of a first molded body 5. The side surface of the component 2 may be located outward from the side surface of the first molded body 5 while the side surface of the component 2 is provided with a depression.

The composite component according to embodiments of the present invention is suitable as a motor rotor. The composite component according to embodiments of the present invention may be used as a motor rotor. A motor rotor including the composite component according to embodiments of the present invention may be used in in-vehicle inverters, water pumps for radiators, fuel pumps, etc.

EXAMPLES

The present invention is specifically described below with reference to, but not limited to, examples.

Production Example 1

Preparation of Rare Earth Bonded Magnet

An amount of 91.96% by mass of samarium iron/nitrogen magnetic powder (Nichia Corporation, Z12-C1, average particle size: 3 μm) was mixed with 7.74% by mass of nylon 12 resin powder and 0.3% by mass of phenolic antioxidant powder using a mixer. The powder mixture was introduced and kneaded in a twin-screw kneader at 210° C. to give a kneaded mixture. The kneaded mixture was cooled and then cut into an appropriate size to obtain a bonded magnet composition. The bonded magnet composition was injection-molded in a mold configured to produce a molded article having a diameter of 30 mm and a height of 4 mm, while applying a magnetic field of 716 kA/m in parallel with the height direction, thereby obtaining a rare earth magnet 1 as shown in FIG. 2A. The rare earth magnet 1 was subjected to multipolar magnetization in a magnetic field of 3 T.

Preparation of First Composite

A component 2 (yoke) made of SS400 having a diameter of 30 mm and a height of 2 mm was adsorbed onto the opposite pole face of the obtained rare earth magnet by the magnetic force of the rare earth magnet such that their diameters overlapped, thereby forming a joint surface 3. Thus, a first composite 4 as shown in FIG. 2A was obtained.

Preparation of First Molded Body

A base material made of polyphenylene sulfide was lathed to obtain a first molded body 5 having a vessel shape with a diameter of 32 mm, a height of 7 mm, and a thickness of 1 mm.

Example 1

Preparation of Second Composite

The first molded body was fitted onto the first composite as shown in FIG. 2B to obtain a second composite 6. The pole face provided across the first molded body in the second composite was scanned in the circumferential direction using a Hall element to determine a surface magnetic flux density distribution. The maximum value of the surface magnetic flux density distribution was defined as Bm1.

Preparation of Second Molded Body

The second composite 6 was inserted into a mold, and polyphenylene sulfide was injection-molded at 320° C. around the component and the first molded body as shown in FIG. 2C to obtain a composite component 8 including a second molded body 7. The pole face provided across the first molded body in the second composite was scanned in the circumferential direction using a Hall element to determine a surface magnetic flux density distribution. The maximum value of the surface magnetic flux density distribution was defined as Bm2. Here, the heat degradation (Bm2/Bm1) was evaluated to be 0.98.

Comparative Example 1

Preparation of Second Composite

A first composite which was the same as that used in Example 1 was inserted into a mold, and polyphenylene sulfide was injection-molded at 320° C. around the first composite to obtain a second composite having the same size and structure as in Example 1. Moreover, the surface magnetic flux density distribution (Bm1) of the second composite was determined as in Example 1.

Preparation of Second Molded Body

The second composite having undergone injection molding was treated as in Example 1 to obtain a composite component of Comparative Example 1 including a second molded body. Then, the Bm2 of the composite component of Comparative Example 1 was determined. The heat degradation (Bm2/Bm1) was evaluated to be 0.89, demonstrating that the magnetic properties (surface magnetic flux density distribution) of the composite component of Comparative Example 1 were lower than those of the composite component of Example 1.

INDUSTRIAL APPLICABILITY

The composite component according to embodiments of the present invention is suitably applicable to motor rotors, etc. because the deterioration in magnetic properties can be reduced even when a hot resin is injection-molded onto a heat-sensitive permanent magnet.

REFERENCE SIGNS LIST

1: rare earth magnet (first component)
2: component (second component)
3: joint surface
4: first composite
5: first molded body
6: second composite
7: second molded body
8: composite component

The invention claimed is:

1. A method of producing a composite component, the method comprising:

preparing a second composite by fitting a first molded body, the first molded body including a resin and obtained by a procedure comprising injection molding using a mold and taking out a molded body from the mold, onto a first composite comprising a rare earth magnet and a component contacting the rare earth magnet, such that the first molded body covers at least an entirety of a surface of the rare earth magnet that is not contacted by the component; and forming a second molded body by inserting the second composite into a mold and injection-molding a thermoplastic resin such that the thermoplastic resin covers at least an entirety of a surface of the second composite that is not covered by the first molded body in the cross-sectional view.

2. The method of producing a composite component according to claim 1, wherein the first molded body is compatible with the thermoplastic resin.

3. The method of producing a composite component according to claim 1, wherein, the thermoplastic resin is injection-molded such that the thermoplastic resin overlaps a portion of the first molded body.

4. The method of producing a composite component according to claim 1, wherein the thermoplastic resin is a crystalline thermoplastic resin.

5. The method of producing a composite component according to claim 1, wherein, the thermoplastic resin is injection-molded such that the injection-molded thermoplastic resin clamps a portion of the first molded body due to cure shrinkage.

6. The method of producing a composite component according to claim 1, wherein the first molded body has at least one selected from the group consisting of a protrusion, a turnup, and a depression.

7. The method of producing a composite component according to claim 1, wherein the rare earth magnet is a bonded magnet.

8. The method of producing a composite component according to claim 7, wherein the rare earth magnet comprises a first magnetic powder that is a rare earth magnetic powder and a first resin, wherein the first molded body comprises a second magnetic powder and a second resin, and wherein at least one selected from the following conditions (1) to (3) is satisfied:

(1) a mass ratio of the second magnetic powder to the second resin is smaller than a mass ratio of the first magnetic powder to the first resin;

(2) the second resin has a higher resistance to environment than the first resin;

(3) the second magnetic powder has a higher resistance to environment than the first magnetic powder.

9. A method of producing a composite component, the method comprising:

preparing a second composite by fitting a first molded body, the first molded body including at least one of non-magnetic steel, magnetic steel, or ceramic, onto a first composite comprising a rare earth magnet and a component contacting the rare earth magnet, such that the first molded body covers at least an entirety of a surface of the rare earth magnet that is not contacted by the component; and forming a second molded body by inserting the second composite into a mold and injection-molding a thermoplastic resin such that the thermoplastic resin covers at least an entirety of a surface of the second composite that is not covered by the first molded body in the cross-sectional view.

10. The method of producing a composite component according to claim 9, wherein, the thermoplastic resin is injection-molded such that the thermoplastic resin overlaps a portion of the first molded body.

11. The method of producing a composite component according to claim 9, wherein the thermoplastic resin is a crystalline thermoplastic resin.

12. The method of producing a composite component according to claim 9, wherein, the thermoplastic resin is injection-molded such that the injection-molded thermoplastic resin clamps a portion of the first molded body due to cure shrinkage.

13. The method of producing a composite component according to claim 9, wherein the first molded body has at least one selected from the group consisting of a protrusion, a turnup, and a depression.

14. The method of producing a composite component according to claim 9, wherein the rare earth magnet is a bonded magnet.

* * * * *